US012798511B2

(12) United States Patent
Möker et al.

(10) Patent No.: US 12,798,511 B2
(45) Date of Patent: Nov. 17, 2026

(54) BELT DEFLECTION APPARATUSES FOR A SAFETY BELT DEVICE OF A TRANSPORTATION VEHICLE

(71) Applicants: VOLKSWAGEN AKTIENGESELLSCHAFT, Wolfsburg (DE); AUDI AG, Ingolstadt (DE)

(72) Inventors: Carsten Möker, Rühen (DE); Fabian Götze, Walting (DE); Walter Birk, Gerstetten (DE); Meliksah Ücüncü, Ulm (DE); Peter Linde, Blaustein (DE); Thomas Kloss, Elchingen (DE); Udo Untch, Ulm (DE)

(73) Assignees: VOLKSWAGEN AKTIENGESELLSCHAFT (DE); AUDI AG (DE)

( * ) Notice: Subject to any disclaimer, the term of this patent is extended or adjusted under 35 U.S.C. 154(b) by 107 days.

(21) Appl. No.: 18/856,113

(22) PCT Filed: Mar. 30, 2023

(86) PCT No.: PCT/EP2023/058295
§ 371 (c)(1),
(2) Date: Oct. 11, 2024

(87) PCT Pub. No.: WO2023/198469
PCT Pub. Date: Oct. 19, 2023

(65) Prior Publication Data

US 2026/0184283 A1 Jul. 2, 2026

(30) Foreign Application Priority Data

Apr. 13, 2022 (DE) .................... 10 2022 203 756.1

(51) Int. Cl.
*B60R 22/185* (2006.01)
*B60R 22/18* (2006.01)

(52) U.S. Cl.
CPC .. *B60R 22/1855* (2013.01); *B60R 2022/1812* (2013.01)

(58) Field of Classification Search
CPC .................... B60R 2022/1812; B60R 22/1855
See application file for complete search history.

(56) References Cited

U.S. PATENT DOCUMENTS 5,411,292 A * 5/1995 Collins .............. B60R 22/1855 280/808
9,821,757 B2 11/2017 Moeker et al.
(Continued)

FOREIGN PATENT DOCUMENTS

DE 60225876 T2 4/2009
DE 102013216326 A1 2/2015
(Continued)

OTHER PUBLICATIONS

Search Report; International Patent Application No. PCT/EP2023/058295, Jul. 10, 2023.

*Primary Examiner* — Nicole T Verley
(74) *Attorney, Agent, or Firm* — BARNES & THORNBURG LLP

(57) ABSTRACT

A belt deflection apparatus for a safety belt device of a transportation vehicle includes a main element connectable to a belt lock of the safety belt device; and a belt contact element, which is relative to the main element and has a contact face for the belt of the safety belt device, the main element includes two guide portions, which are arranged on opposite sides of the belt contact element, for guiding the belt contact element.

13 Claims, 4 Drawing Sheets

(56) References Cited

U.S. PATENT DOCUMENTS

| | | | | |
|---|---|---|---|---|
| 9,988,013 | B2 * | 6/2018 | Cahill | B60R 22/18 |
| 11,142,161 | B2 * | 10/2021 | Clauss | A44B 11/2553 |
| 11,547,183 | B2 | 1/2023 | Brandt et al. | |
| 11,930,893 | B2 | 3/2024 | Knoedl et al. | |
| 12,384,324 | B2 * | 8/2025 | Penfold | B60R 22/18 |
| 2016/0206050 | A1 * | 7/2016 | Aoyagi | B60R 22/30 |
| 2017/0144623 | A1 * | 5/2017 | Cahill | B60R 22/28 |
| 2019/0135224 | A1 | 5/2019 | Krambeck et al. | |
| 2020/0298791 | A1 * | 9/2020 | Clauss | B60R 22/201 |

FOREIGN PATENT DOCUMENTS

| | | | | | |
|---|---|---|---|---|---|
| DE | 102016106440 | B4 | * | 5/2019 | B60R 22/18 |
| DE | 102018220620 | A1 | | 6/2020 | |
| DE | 102019109697 | A1 | | 10/2020 | |
| DE | 102020112406 | B3 | * | 4/2021 | A44B 11/2561 |
| DE | 102019008566 | A1 | * | 6/2021 | B60R 22/20 |
| DE | 102020201614 | A1 | * | 8/2021 | B60R 22/18 |
| KR | 20130038538 | A | * | 4/2013 | B60R 22/18 |
| WO | WO-2021228803 | A1 | * | 11/2021 | A44B 11/2561 |
| WO | WO-2025232612 | A1 | * | 11/2025 | A44B 11/14 |

* cited by examiner

BELT DEFLECTION APPARATUSES FOR A SAFETY BELT DEVICE OF A TRANSPORTATION VEHICLE

PRIORITY CLAIM

This patent application is a U.S. National Phase of International Patent Application No. PCT/EP2023/058295, filed 30 Mar. 2023, which claims priority to German Patent Application No. 10 2022 203 756.1, filed 13 Apr. 2022, the disclosures of which are incorporated herein by reference in their entireties.

SUMMARY

Illustrative embodiments relate to a belt deflection apparatus for a safety belt device of a transportation vehicle according to the preamble of claim 1 as well as to a belt deflection apparatus for a safety belt device of a transportation vehicle according to the preamble of claim 13.

BRIEF DESCRIPTION OF THE DRAWINGS

Disclosed embodiments will be described in more detail below with reference to drawings, in which.

DETAILED DESCRIPTION

Figure 1:
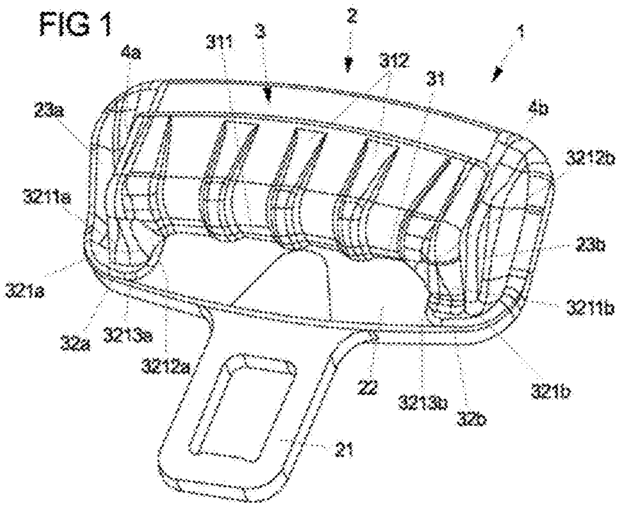
FIG. 1 schematically shows a belt deflection apparatus according to an exemplary embodiment of the disclosed.

From DE 10 2018 220 620 A1, a belt deflection apparatus for a safety belt device is known, which comprises a main element connectable to a belt lock of an insertion tongue. A belt of the safety belt device is guided and deflected over a belt contact element of the belt deflection apparatus, wherein the belt contact element is movable with respect to the main element. A movement of the belt contact element in relation to the main element as a result of a loading of the safety belt results in a deformation of an intermediate element and clamping of the safety belt between the belt contact element and the intermediate element. It is problematic in such belt deflection apparatuses that the safety belt carries out a lateral movement upon force effect on it with a component parallel to a contact face of the belt contact element and can at least partially get into a gap between the belt contact element and the main element and can thereby be damaged. DE 10 2019 109 697 A1 describes a plug-in tongue for a seat belt having a plug-in-tongue component and having a clamping element attached thereto, wherein a belt guide channel is delimited between the plug-in-tongue component and the clamping element. The clamping element comprises a middle part and two side parts which extend from the two ends of the middle part transversely thereto. The middle part furthermore has a middle guide surface, which is situated between the two side parts, and the two side parts have oppositely situated lateral guide surfaces, which constitute delimitations of the belt guide channel. US 2019/135224 A1 describes a buckle tongue which is of compact construction and which, in the event of an accident, allows safe decoupling of the upper-body portion from the pelvic portion of the belt strap. For this purpose, the buckle tongue has a tongue body in which a belt slot is configured for passage of a belt strap. Moreover, the buckle tongue has a deflection element which is arranged in a movable manner in the tongue body, wherein the belt strap, in an unloaded passage position of the deflection element, is able to move through the belt slot and, in a loading position of the deflection element brought about by a tensile force introduced into the belt strap, is at least inhibited in terms of its mobility by means of the deflection element. Furthermore, the deflection element is able to be moved with a constriction portion along an abutment surface of the tongue body from the passage position into the loading position so that, in the loading position, the belt strap is in areal abutment both with the abutment surface of the tongue body and with the constriction portion of the deflection element by way of a belt-strap portion. In the loading position, the tongue body engages through at least a portion of the deflection element by way of a region having the abutment surface.

The disclosed embodiment addresses the problem of avoiding damage to the seat belt, in particular, by inhibiting a lateral movement of the seat belt. This problem is solved by providing a belt deflection apparatus, wherein the abutment surface has multiple rib structures.

The configuration of the at least one belt-conducting portion ensures that slipping of the safety belt into the gap between the guide portion of the main element and the belt-conducting portion of the belt contact element is omitted as possible even upon loading of the belt with a component parallel to the contact face. Of course, it is conceivable that the belt deflection apparatus comprises a gap on both sides of the belt contact element. Accordingly, two gaps can be present, which each extend between the guide portions of the main element and the respective belt-conducting portions. In this case, both belt-conducting portions are formed such that they conduct the belt upon loading of the safety belt parallel to the contact face and in the direction of one of the two gaps such that it runs over the respective gap at least in portions.

The rib structures moreover allow inhibition of a lateral movement of the seat belt.

It is conceivable that the at least one gap is located on a side of the at least one belt-conducting portion facing away from the contact face. For example, the gap (in particular the entire gap) is at a distance from the contact face. Thus, the gap is quasi displaced to the outside with respect to the previously known belt deflection apparatus and in particular does not immediately adjoin to the contact face.

According to a configuration of the disclosed embodiment, the at least one belt-conducting portion comprises at least one section, which protrudes from the contact face. For example, a main extension plane of the section at least approximately runs obliquely or perpendicularly to the contact face. It is in particular conceivable that the entire belt-conducting portion protrudes from the contact face, thus is in particular oriented obliquely or perpendicularly to the contact face.

It is also possible that the at least one belt-conducting portion comprises multiple differently oriented surface portions. In particular, the surface portions are oriented such that the desired guide of the safety belt obliquely over the gap is effected upon a force effect on the belt parallel to the contact face.

Moreover, it is conceivable that at least one of the surface portions runs obliquely to the contact face. For example, this at least one surface portion at least approximately runs evenly. However, this is not mandatory. Rather, the at least one surface portion could also comprise a curvature. Accordingly, it is possible that this at least one surface portion extends along an imagined (not necessarily straight) line, which is in a plane, which runs obliquely to a plane oriented perpendicularly to the contact face. For example, the at least one surface portion extends along a portion of a circumference of an imagined ellipse, which is oriented obliquely to the plane running perpendicularly to the contact face.

However, the at least one belt-conducting portion does not necessarily have to comprise multiple differently oriented surface portions. It is e.g., also possible that only one surface portion is present, which in particular runs obliquely to the contact face, as explained above.

According to a further configuration of the disclosed embodiment, the main element includes an inner side opposing a portion of the contact face, wherein the belt-after mounting on the belt deflection apparatus-extends through between the inner side and the portion of the contact face, and wherein the at least one belt-conducting portion comprises at least one upper surface portion (in particular facing a belt tongue of the belt deflection apparatus), which runs obliquely or perpendicularly to the inner side. In particular, the at least one upper surface portion runs along a main extension plane, which is oriented obliquely or perpendicularly to the inner side.

Moreover, it is possible that the belt tongue of the main element is insertable into the belt lock along an insertion direction, wherein the upper surface portion is inclined in a direction opposite to the insertion direction (away from the belt tongue) coming from the inner side of the main element (i.e., coming from an end area of the upper surface portion opposing the inner side).

According to another development of the disclosed embodiment, the upper surface portion forms a first surface portion of the belt-conducting portion and the above described surface portion running obliquely to the contact face forms a second surface portion of the belt-conducting portion, wherein the second surface portion runs obliquely also to the first surface portion.

The contact face of the belt deflection apparatus in particular runs at least partially curved. The curvature of the contact face in particular ensures a deflection of the safety belt being in contact with the contact face. For example, the contact face includes a curved portion, which adjoins to the portion of the contact face opposing the inner side of the main element.

Upon force effect on the safety belt parallel to the contact face and a lateral (parallel to the contact face) movement of the safety belt caused thereby towards the convex element, the safety belt will come into contact with the convex element, for example, the safety belt will move over the convex element. This contact in particular ensures a dissipation of movement energy of the safety belt, for example, by sliding friction. It is also possible that the convex element engages with filaments of the material of the safety belt and retains the belt in this manner. It is conceivable that the convex element is configured such that a damage of the safety belt is avoided as possible in this case. In particular, the convex element has a convex (curved) outer contour at least in portions. It is possible that the convex element is formed integrally with the belt-conducting portion or with the entire belt contact element. For example, the belt contact element is a plastic part (in particular a plastic injection molded part).

As already explained above in context of the first feature of the disclosed embodiment, the main element can include an inner side opposing the contact face, wherein the belt-after mounting on the belt deflection apparatus-extends through between the inner side and a portion of the contact face. It is possible that the convex element is arranged such that it faces the inner side of the main element.

For example, the at least one belt-conducting portion—as also already explained above to the first inventive feature—comprises at least one upper surface portion, which runs obliquely to the inner side of the main element. It is possible that the convex element adjoins to an end area of the upper surface portion facing the inner side.

The configurations explained above with respect to the first feature of the disclosed embodiment can of course be used analogously to the development of the belt deflection apparatus according to the second feature of the disclosed embodiment. In particular, a gap is between at least one of the guide portions and the belt-conducting portion, wherein the belt-conducting portion is formed such that it conducts the belt upon loading parallel to the contact face and in the direction of the gap such that the belt runs obliquely over the gap at least in portions. Hereto, the belt-conducting portion can, for example, comprise multiple differently oriented surface portions, as explained above.

Figure 3:
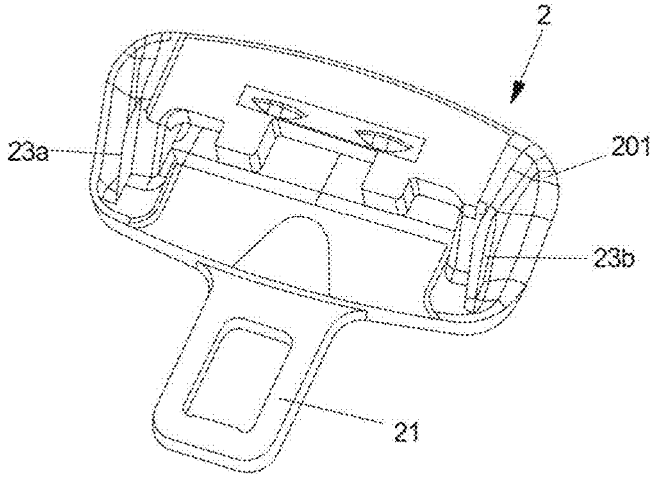
FIG. 3 schematically shows a main element of the belt deflection apparatus from FIG. 1 and FIG. 2.

The belt deflection apparatus 1 illustrated in FIG. 1 in perspective view for a safety belt device of a transportation vehicle includes a main element 2 connectable to a belt lock (not illustrated). For connecting to the belt lock, the main element 2 includes a belt tongue 21, which is insertable into the belt lock in known manner and lockable to it. For example, the main element 2 includes a plastic element 201, at which the belt tongue 21, for example, formed of metal is arranged; cf. FIG. 3.

Moreover, the belt deflection apparatus 1 comprises a belt contact element 3 ("slider") movable in relation to the main element 2, wherein the belt contact element 3 includes a contact face 31, with which a safety belt, not illustrated in FIG. 1, of the safety belt device at least partially contacts. The safety belt in particular runs between an inner side 22 of the main element 2 and an opposing inner portion 310 of the contact face 31 and is deflected on a curved portion 311 of the contact face 31 adjoining to the inner portion 310.

Figure 4:
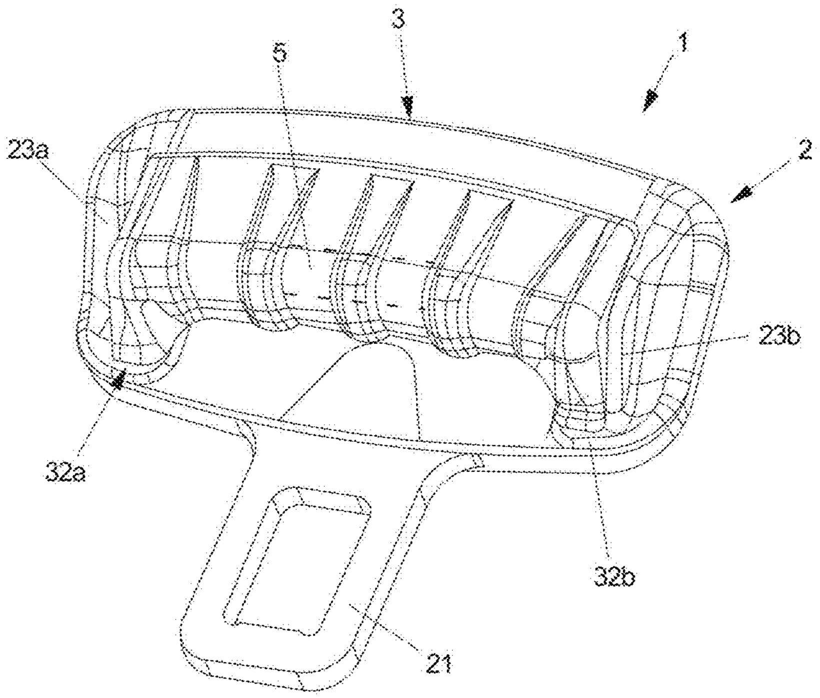
FIG. 4 schematically shows the belt deflection apparatus of FIG. 1 and FIG. 2 in partially transparent representation.

In addition, the main element 2 comprises two guide portions 23_a_, 23_b_ arranged on opposite sides of the belt contact element 3 (viewed along the contact face 31), which serve for guiding a movement of the belt contact element 3. Upon a loading of the safety belt, a movement of the belt contact element 3 away from the belt tongue 21 is in particular effected. It is possible that the belt deflection apparatus 1 is formed such that such a movement of the belt contact element 3 results in clamping of the safety belt, for example, as a result of a deformation of a deformable element of the main element 2, as it is described in the initially already mentioned DE 10 2018 220 620 A1. Hereby, reference is expressly made to DE 10 2018 220 620 A1 in this respect. The partially transparent representation of the belt deflection apparatus 1 of FIG. 4 shows a corresponding deformable element 5.

The belt contact element 3 includes two lateral belt-conducting portions 32*a*, 32*b*, which each laterally adjoin to the belt contact face 31. A gap 4*a*, 4*b* is respectively between the guide portions 23*a*, 23*b* and the belt-conducting portions 32*a*, 32*b*. The gaps 4*a*, 4*b* allow the movement of the belt contact element 3 in relation to the main element 2. The belt-conducting portions 32*a*, 32*b* are formed such that they each conduct the safety belt upon loading with a force component parallel to the contact face 31 and in the direction of one of the gaps 4*a*, 4*b* such that the belt runs obliquely over the respective gap 4*a*, 4*b* at least in portions. In this manner, slipping of the belt into the gap 4*a*, 4*b* and thereby the damage of the belt is prevented. The principal course of the safety belt S through the belt deflection apparatus 1 is indicated by a dashed line in FIG. 2. However, the actual course of the safety belt deviates from this representation since the safety belt would be partially covered by the lateral belt-conducting portions 32*a*, 32*b* in the lateral view of FIG. 2.

To inhibit lateral movement of the seat belt (that is to say, a movement parallel to the abutment surface 31), it is provided that the abutment surface 31 may have multiple rib structures 312.

Figure 2:
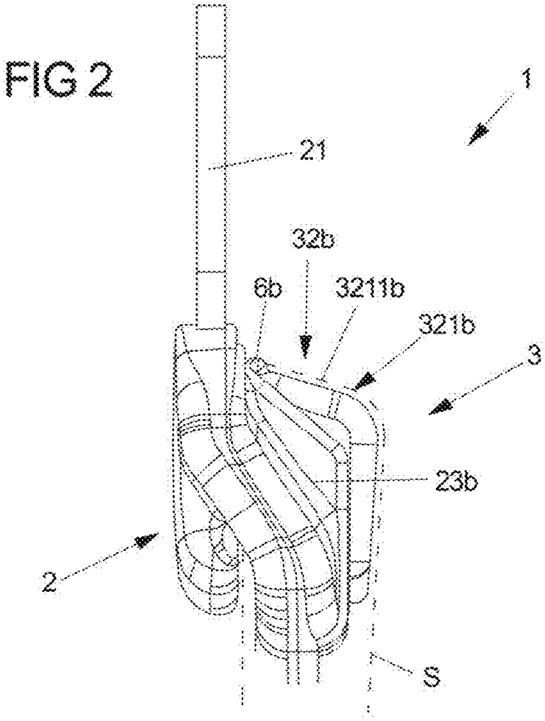
FIG. 2 schematically shows the belt deflection apparatus from FIG. 1 in lateral view.

The belt-conducting portions 32*a*, 32*b* each protrude from the contact face 31 in the direction of the belt tongue 21 with a section 321*a*, 321*b* and thus delimit the contact face 31. The gaps 4*a*, 4*b* are on a side, facing away from the contact face 31, of the protruding sections 321*a*, 321*b* (thus oriented obliquely or perpendicularly to the contact face 31). The protruding sections 321*a*, 321*b* each comprise an upper surface portion 3211*a*, 3211*b*, which each runs obliquely to the inner side 22 of the main element 2 or to the belt tongue 21 (cf. also FIG. 2). In particular, the upper surface portions 3211*a*, 3211*b* are inclined in a direction opposite to an insertion direction, along which the belt tongue 21 is inserted into the belt lock, coming from the inner side 22 or the belt tongue 21. In the representation of FIG. 2, the surface portions 3211*a*, 3211*b* are accordingly downwards inclined coming from the belt tongue 21.

Figure 5:
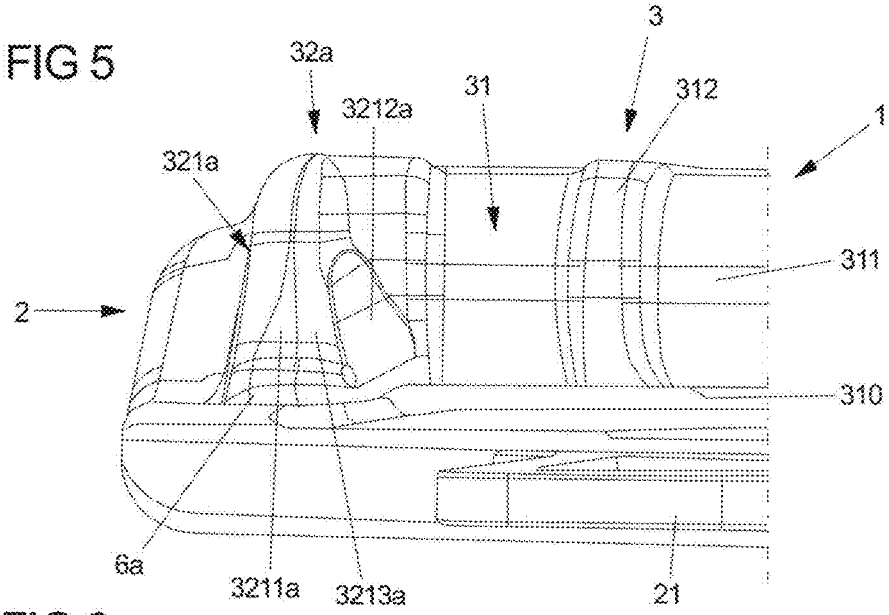
FIG. 5 schematically shows an enlarged representation of an area of the belt deflection apparatus of FIG. 1 and FIG. 2.
Figure 6:
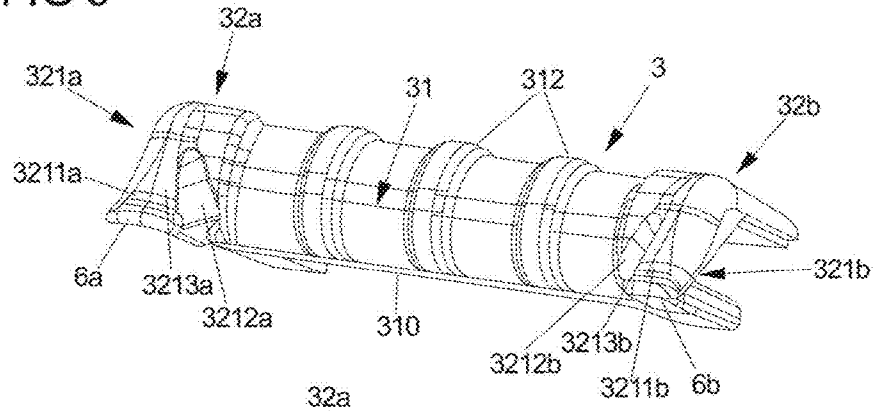
FIG. 6 schematically shows a belt contact element of the belt deflection apparatus of the FIGS. 1 and 2.
Figure 7:
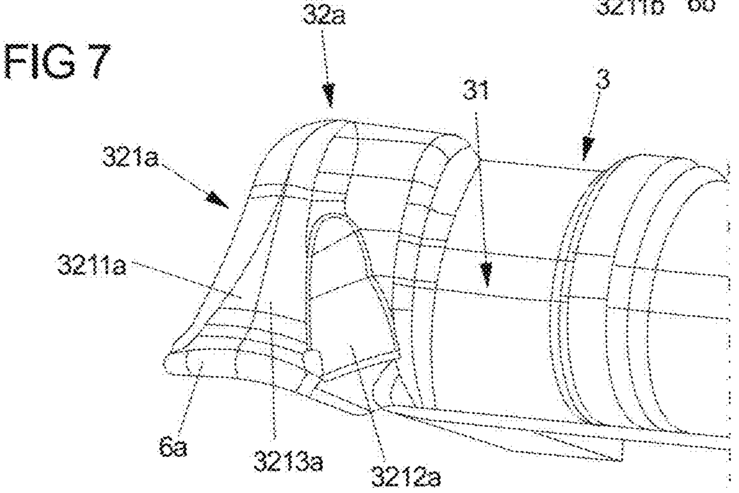
FIG. 7 schematically shows an enlarged representation of an area of the belt contact element from FIG. 6.

Besides the upper surface portions 3211*a*, 3211*b*, the belt-conducting portions 32*a*, 32*b* each comprise further surface portions; cf. in particular FIGS. 5 to 7. In particular, the belt-conducting portions 32*a*, 32*b* additionally each include an obliquely oriented surface portion 3212*a*, 3212*b*. The obliquely oriented surface portions 3212*a*, 3212*b* each extend along an imagined line, which is in a plane, which runs obliquely to a plane oriented perpendicularly to the contact face 31 of the belt contact element 3 or the inner side 22 of the main element 2. The plane oriented perpendicularly to the contact face 31 of the belt contact element 3 or the inner side 22 of the main element 2 would be the drawing plane in FIG. 2. The line, along which the surface portions 3212*a*, 3212*b* each extend, for example, runs curved at least in portions such that the surface portions 3212*a*, 3212*b* according to the FIGS. 5 to 7 each have a curvature. However, it is also conceivable that the line extends substantially straight and the surface portions 3212*a*, 3212*b* are correspondingly at least substantially flatly configured.

Moreover, inner side areas of the belt-conducting portions 32*a*, 32*b* facing the contact face 31 form transition surface portions 3213*a*, 3213*b*, which each form a transition between the obliquely oriented surface portions 3212*a*, 3212*b* and the upper surface portions 3211*a*, 3211*b* in the manner of shingles.

Figure 8:
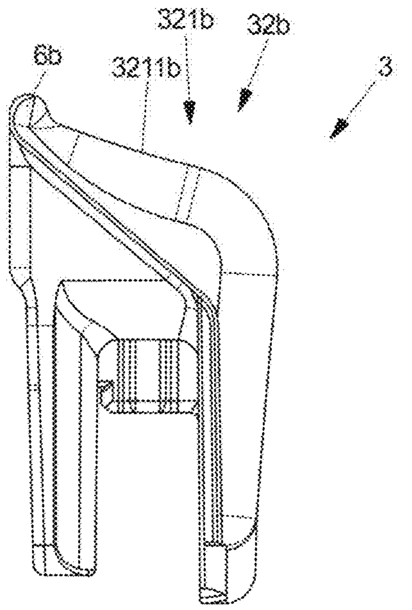
FIG. 8 schematically shows the belt contact element from FIG. 6 in lateral view.

As in particular illustrated in FIG. 8, the belt-conducting portions 32*a*, 32*b* moreover each comprise a convex element in the form of a convexly formed lip 6*a*, 6*b*, which is respectively located on an end, facing the inner side 22 of the main element 2, of the upper surface portions 3211*a*, 3211*b*. The lips 6*a*, 6*b* each protrude from the associated upper surface portion 3211*a*, 3211*b* (in particular in the direction of the belt tongue 21) and extend at least approximately across the entire width of the respective belt-conducting portion 32*a*, 32*b* (viewed in a direction parallel to the contact face 31); in particular in the manner of a cylinder or cylinder segment. For example, the lips 6*a*, 6*b* comprise an at least approximately elliptical, in particular circular, contour in a cross-section oriented perpendicularly to the contact face 31. It is also conceivable that the contour of the lips 6*a*, 6*b* corresponds to the contour of an elliptical segment or circular segment. However, the lips 6*a*, 6*b* do not necessarily continuously have one and the same radius. It is conceivable that different segments of the lips 6*a*, 6*b* are differently convexly formed, i.e., the outer contour of different segments of the lips 6*a*, 6*b* has different radii.

Figure 9:
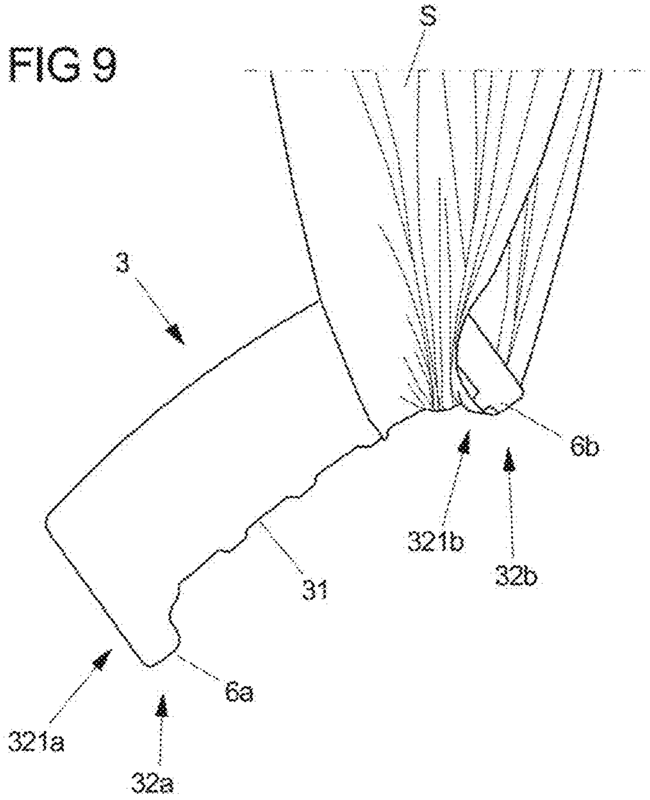
FIG. 9 schematically shows a belt deflection apparatus with a safety belt under lateral loading.

Upon force effect on the safety belt parallel to the contact face 31 of the belt contact element 3 and an at least partially lateral movement of the safety belt caused thereby, the safety belt will move over one of the lips 6*a*, 6*b*, wherein movement energy of the belt is dissipated and a further lateral movement parallel to the contact face 31 of the belt is, for example, inhibited by the contact with the respective lip 6*a*, 6*b*. In particular, the lips 6*a*, 6*b* additionally contribute to the fact that getting of the belt into one of the gaps 4*a*, 4*b* is prevented. The effect of the lips 6*a*, 6*b* can also be taken from the representation of FIG. 9. Accordingly, by a lateral force effect (parallel to the contact face 31 of the belt contact element 3), a lateral movement of the belt S and a partial bunching of the belt S in the area of one of the belt-conducting portions (of the belt-conducting portion 32*b*) arises. However, the lip 6*b* of the belt-conducting portion 32*b* inhibits a further movement of the belt S parallel to the contact face 31 and thus contributes to the fact that the belt S carries out a movement running obliquely to the contact face 31 and runs obliquely over the gap 4*b* between the belt contact element 3 and the main element 2 (not illustrated in FIG. 9) of the belt deflection apparatus. However, the lips 6*a*, 6*b* are optional.

The invention claimed is:

1. A belt deflection apparatus for a safety belt device of a transportation vehicle, the apparatus comprising:

a main element connectable to a belt lock of the safety belt device; and a belt contact element movable in relation to the main element, the belt contact element comprising a contact face for a belt of the safety belt device, wherein, the main element includes two guide portions arranged on opposite sides of the belt contact element for guiding the belt contact element, wherein, lateral belt-conducting portions of the belt contact element adjoin the contact face such that a gap is provided between at least one of the guide portions and one of the belt-conducting portions, wherein, the at least one belt-conducting portion conducts the belt upon a loading parallel to the contact face and in the direction of the gap such that the belt runs obliquely over the gap at least in portions, wherein, the main element includes an inner side opposing a portion of the contact face, wherein, the belt, after mounting on the belt deflection apparatus, extends through between the inner side and the portion of the contact face, wherein, the at least one belt-conducting portion includes at least one upper surface portion, which runs obliquely or perpendicularly to the inner side, and wherein, the contact face includes a plurality of rib structures.

2. The belt deflection apparatus of claim 1, wherein the gap is located on a side, facing away from the contact face, of the at least one belt-conducting portion.

3. The belt deflection apparatus of claim 1, wherein the gap extends away a distance from the contact face.

4. The belt deflection apparatus of claim 1, wherein the at least one belt-conducting portion includes at least one section protruding from the contact face.

5. The belt deflection apparatus of claim 1, wherein the at least one belt-conducting portion includes a plurality of differently oriented surface portions.

6. The belt deflection apparatus of claim 5, wherein at least one of the plurality of differently oriented surface portions runs obliquely to the contact face.

7. The belt deflection apparatus of claim 6, wherein the surface portion running obliquely to the contact face extends along an imagined line, which is in a plane that runs obliquely to a plane oriented perpendicularly to the contact face.

8. The belt deflection apparatus of claim 6, wherein the surface portion running obliquely to the contact face extends along a portion of a circumference of an imagined ellipse, which runs obliquely to the plane oriented perpendicularly to the contact face.

9. The belt deflection apparatus of claim 1, wherein the main element includes a belt tongue, which is insertable into the belt lock along an insertion direction, wherein the upper surface portion is inclined in a direction opposite to the insertion direction coming from the inner side.

10. The belt deflection apparatus of claim 1, wherein the upper surface portion forms a first surface portion of the belt-conducting portion and the surface portion running obliquely to the contact face forms a second surface portion of the belt-conducting portion, wherein the second surface portion runs obliquely also to the first surface portion.

11. The belt deflection apparatus of claim 1, wherein the contact face runs at least partially curved.

12. A belt deflection apparatus for a safety belt device of a transportation vehicle, the belt deflection apparatus comprising:

a main element connectable to a belt lock of the safety belt device; and a belt contact element movable in relation to the main element, which comprises a contact face for a belt of the safety belt device, wherein, the main element includes two guide portions arranged on opposite sides of the belt contact element for guiding the belt contact element, wherein, lateral belt-conducting portions of the belt contact element adjoin to the contact face, wherein at least one of the belt-conducting portions includes a convex element wherein, the main element includes an inner side opposing the contact face, wherein the belt, after mounting on the belt deflection apparatus, extends through between the inner side and the contact face, wherein, the at least one belt-conducting portion includes at least one upper surface portion, which runs obliquely or perpendicularly to the inner side, and wherein, the convex element is in the form of a convexly formed lip located at an end of the upper surface portion facing the inner side of the main element and protruding from the upper surface portion.

13. The belt deflection apparatus of claim 12, wherein the contact face includes a plurality of rib structures.

* * * * *